| United States Patent [19] | [11] Patent Number: 4,916,012 |
| Sawanobori et al. | [45] Date of Patent: Apr. 10, 1990 |

[54] CEMENT REINFORCING FIBER

[75] Inventors: Takeo Sawanobori, Kawasaki; Yuji Noguchi, Yokohama; Hiromichi Sakai, Kitakyushu; Kazuhiro Sone, Yokkaichi, all of Japan

[73] Assignee: Mitsubishi Kasei Corporation, Tokyo, Japan

[21] Appl. No.: 309,959

[22] Filed: Feb. 9, 1989

Related U.S. Application Data

[63] Continuation of Ser. No. 38,899, Apr. 16, 1987, abandoned.

[30] Foreign Application Priority Data

Apr. 23, 1986 [JP] Japan .................................. 61-93670
May 6, 1986 [JP] Japan ................................ 61-103479

[51] Int. Cl.$^4$ ........................ B32B 9/00; B32B 15/00; C04B 7/02

[52] U.S. Cl. ..................................... 428/367; 106/99; 427/407.1; 428/375; 428/379; 428/383; 428/390; 428/392; 428/395

[58] Field of Search ............... 428/367, 375, 378, 390, 428/408; 427/407.1

[56] References Cited

U.S. PATENT DOCUMENTS

| 4,123,287 | 10/1978 | Cockram | 428/375 X |
| 4,133,928 | 1/1979 | Riley et al. | 428/255 |
| 4,173,486 | 11/1979 | Cheetham et al. | 428/375 |
| 4,259,403 | 3/1981 | Tomlinson | 428/390 |
| 4,314,003 | 2/1982 | Curnow et al. | 428/367 X |
| 4,472,463 | 9/1984 | Solomon | 427/412 X |

*Primary Examiner*—Lorraine T. Kendell
*Attorney, Agent, or Firm*—Oblon, Spivak, McClelland, Maier & Neustadt

[57] ABSTRACT

A cement reinforcing fiber obtained by impregnating an organic or inorganic fiber with a thermosetting resin, then coating it with a rubber solution or rubber latex, and curing it.

5 Claims, No Drawings

CEMENT REINFORCING FIBER

This is a continuation of Ser. No. 038,899, filed 4/16/87, now abandoned.

The present invention relates to a cement reinforcing fiber having high flexural strength for a fiber-reinforced cement composite material.

With respect to cement type building materials, the requirements for the flame-proofing property, flame resistance, earthquake-proofing property, etc. have been increasingly severe in recent years. The performance of the reinforcing fiber is being improved to meet the requirements. However, no adequate improvement of the performance has been realized by a reinforcing method wherein conventional fibers are employed.

Conventional reinforcing methods may be classified into two categories. One of them is a method wherein chopped strands obtained by cutting the fiber in a predetermined length, are dispersed in a cement matrix for reinforcement, and the other is a method wherein a continuous fiber is incorporated into cement for reinforcement.

However, in either one of the conventional methods, the adhesion between the cement and the reinforcing fiber is poor, and no adequate performance has been obtained.

The present inventors have conducted extensive research to solve such conventional problems, and as a result, have found that the adhesion between the cement and the reinforcing fiber can be improved by providing a coating layer having a specific composition to the reinforcing fiber. The present invention has been accomplished on the basis of this discovery.

Accordingly, it is an object of the present invention to improve the adhesion between the cement and the reinforcing fiber, and to provide a cement reinforcing fiber having excellent flexural strength.

The object can be accomplished by a cement reinforcing fiber obtained by impregnating an organic or inorganic fiber with a thermosetting resin, then coating it with a rubber solution or rubber latex, and curing it.

Now, the present invention will be described in further detail with reference to the preferred embodiments.

There is no particular restriction as to the organic or inorganic fiber to be used in the present invention. However, as the organic fiber, a fiber of nylon, polyester or rayon, or an aromatic fiber such as an aramide fiber, may preferably employed. Likewise, as the inorganic fiber, a steel fiber, a glass fiber, a carbon fiber or a graphite fiber may preferably be employed. Among them, particularly preferred is a fiber having a tensile strength of at least 150 kg/mm$^2$ and a Young's modulus of at least 10 ton/mm$^2$. Surface treatment and pretreatment with a finishing agent, may be applied to the fiber. The surface treatment includes vapor phase oxidation, liquid phase oxidation, and a method wherein an oxidizing agent is used. The treatment with a finishing agent may be conducted by using known compounds of epoxy type, acrylate type, polyethylene type, polybutene type, polyester type, polyurethane type or silicon type as a bundling agent, a lubricant or a flexible finishing agent, individually or in combination.

Next, the thermosetting resin to be used for the first treatment in the present invention, may be any conventional resin irrespective of whether it is water-soluble or water-insoluble. For example, an epoxy compound, an unsaturated polyester and a polyimide may be mentioned. Further, a reaction product of a polyhydric alcohol such as ethylene glycol, glycerol, sorbitol or propylene glycol with a halogen-containing epoxide such as epichlorohydrin, and a reaction product of a polyhydric phenol such as resorcinol, hydroquinone, bisphenol A or catechol with the above-mentioned halogen-containing epoxide, may also be mentioned. Such a thermosetting resin may be used in the form of an aqueous solution or emulsion, or in the form of a solution in an organic solvent.

As the rubber to be used in the second treatment in the present invention, a known rubber such as natural rubber, styrene-butadiene rubber, acrylonitrile rubber, an acrylate copolymer, chloroprene rubber, EPDM, butyl rubber, chlorosulfonated polyethylene, fluorinated rubber or polyurethane rubber, may be employed. It may be employed in the form of a suspension having the above rubber solid dissolved therein, or in the form of a latex which can be produced by emulsifying a polymer obtained by emulsion polymerization or by other polymerization method in an aqueous emulsion system with an emulsifier. It is preferred to employ a latex, since the concentration of the rubber solid content can freely be selected. If necessary, a reinforcing material such as a filler, a vulcanizing agent and a vulcanizing accelerator, may be mixed and dispersed in the rubber solution or rubber latex.

Further, in the present invention, a self-crosslinking type modified rubber latex can suitably be employed as the latex for the second treatment. The self-crosslinking type modified rubber latex is obtainable by copolymerizing a main monomer with other reactive monomers, and is self-curable, whereby no additional cross-linking agent is required. As the modified rubber, conventional synthetic rubbers such as styrene-butadiene rubber, acrylonitrile rubber, an acrylate copolymer, chloroprene rubber and chlorosulfonated polyethylene, may be employed. When these synthetic rubbers are prepared by emulsion polymerization, they may be copolymerized with a combination of two or more reactive monomers, including a combination of an epoxy-containing monomer such as glycidyl methacrylate, glycidyl acrylate or allylglycidyl ether and an amino group-containing monomer such as dimethylaminoethyl methacrylate or vinyl pyridine, or a carboxyl group-containing monomer such as acrylic acid, methacrylic acid, itaconic acid, maleic acid or fumaric acid; a combination of the above-mentioned epoxy-containing monomer and a hydroxyl group-containing monomer such as allyl alcohol, 2-hydroxyethyl methacrylate, 2-hydroxyethyl acrylate or 2-hydroxypropyl methacrylate; a combination of the above-mentioned carboxyl group-containing monomer and the above-mentioned hydroxyl group-containing monomer; a combination of N-methylolacrylamide or N-methylolmethacrylamide, or its ether and the above-mentioned amino group-containing monomer; and a combination of an isocyanate such as vinyl isocyanate or allyl isocyanate, the above-mentioned carboxyl group-containing monomer and the above-mentioned hydroxyl group-containing monomer. These reactive monomers are incorporated usually in an amount of from 1 to 10% by weight, preferably from 1 to 5% by weight, relative to the rubber component.

If necessary, a reinforcing material such as a filler may be mixed and dispersed in the latex.

As a method for applying the above-mentioned first and second treatments to the fiber, there may be employed either a continuous impregnation treating method wherein fiber strands or filaments are continuously withdrawn, dipped in a first bath of a thermosetting resin solution by means of e.g. rollers, then cured by passing them through a heat treating zone, then dipped in a second bath of a rubber solution or rubber latex by means of e.g. rollers, cured by passing them through a heat treating zone, and wound up, or a batch impregnation treating method wherein chopped fiber strands or filaments cut into a predetermined length are treated in the same sequence as in the process of the continuous impregnation treating method.

In the present invention, the second treatment may be conducted continuously after the first treatment with a thermosetting resin while the resin is still in a non-cured state. However, it is preferred to conduct the second treatment after the resin has been at least partially cured, in view of the convenience for handling.

The thermosetting resin solution and the rubber solution or rubber latex, usually cover the fiber entirely. However, partial covering may be acceptable so long as the effects of the present invention are adequately obtained. The amount of the thermosetting resin deposited, is preferably from 50 to 200% by weight relative to the fiber. If the amount of the deposited resin is too much, a cohesive failure due to uneven deposition is likely to occur. On the other hand, if the amount of deposition is too small, the tensile strength of the fiber itself can not advantageously be utilized. The amount of deposition of the rubber solid content is usually from 10 to 200% by weight, preferably from 50 to 100% by weight, relative to the fiber. If the amount of the deposited rubber is too much, a cohesive failure of the rubber layer is likely to occur. On other hand, if the amount of deposition is too small, the adhesion with cement tends to deteriorate.

Now, the heat treating temperature for curing the coated thermosetting resin and rubber by heat treatment will be described. The heat treatment after the first treatment is usually conducted at a temperature of at least 70° C. and at most 120° C. for about 30 minutes. When a higher fiber strength is desired, the heat treatment may be conducted at a temperature of at least 150° C. and at most 200° C. for about 1 hour.

The heat treatment after the second treatment is preferably conducted at a temperature of at least 100° C. and at most 200° C. for from 10 to 50 minutes. In either the first or second treatment, if the heat treating temperature is too low, the resin or rubber will not adequately be cured, whereby no adequate strength of the fiber can be obtained. On the other hand, if the heat treating temperature is too high, the resin or rubber undergoes property change and degradation, whereby the adhesion to cement deteriorates.

The fiber thus treated can be used for the reinforcement of cement without any particular restriction as to the shape of the fiber or as to the manner for application as is common to the conventional techniques. It can be used in various forms such as in a short fiber form, a long fiber (strand) form, a sheet form, a non-woven fabric form or a woven fabric form and can be applied in various methods such as a direct spray method, a premix method, an impregnating method (or a hand lay-up method) or a laying up method.

Further, it may be incorporated into a water-curable cement such as Portland cement, blast furnace cement, alumina cement or calcium silicate, and formed into a fiber-reinforced cement material in various forms such as a plate form, a tubular form or a pillar form. The amount of the fiber to be used is determined so that the desired level of strength can be obtained.

Usually, it is used in an amount of from 0.5 to 5 parts by weight relative to 100 parts by weight of the dry weight of cement. The cement matrix can be obtained by mixing cement and water for hydration reaction. For the hydration, water is used usually from 20 to 70 parts by weight relative to 100 parts by weight of the dry weight of cement, and from 30 to 45 parts by weight of water is preferably mixed in order to increase the strength of the cement structure as high as possible. Further, a so-called "mortar" may be employed wherein a filler such as sand or siliceous sand is incorporated in an amount of from 50 to 200 parts by weight relative to 100 parts by weight of cement.

The fiber-reinforced cement material thus obtained has been found to have excellent flexural strength which can not be found in the conventional reinforced cement materials.

Further, by the application of the treatment according to the present invention, the fiber has an anticorrosion effect against water and alkaline substance of cement, whereby a steel or glass fiber can be advantageously used.

The reason why such excellent flexural strength is obtainable by the present invention, is believed to be such that as a rubber layer is coated on the exterior of the fiber impregnated with a thermosetting resin, the rubber layer serves to disperse a flexural stress to prevent the breakage of the resin layer, whereby the strength of the fiber is maintained, and consequently the flexural strength of the cement composite material is improved.

Now, the present invention will be described in further detail with reference to Examples. However, it should be understood that the present invention is by no means restricted to such specific Examples.

EXAMPLE 1

A pitch carbon fiber (length: 30 cm) having a tensile strength of 200 kg/mm$^2$ and a Young's modulus of 40 ton/mm$^2$ was impregnated into a methyl ethyl ketone solution containing 50% by weight of an epoxy resin, and then dried and heat treated at 80° C. for 20 minutes and at 150° C. for 20 minutes to cure the resin. It was then coated with a styrene-butadiene latex having a solid content of 40% with a vulcanizing agent and vulcanizing accelerator preliminarily mixed and dispersed (manufactured by Nippon Zeon). Then, it was dried at 80° C. for 20 minutes, and further subjected to heat treatment at 150° C. for 20 minutes to cure the rubber. The amounts of deposition of the resin and the rubber relative to the carbon fiber, were 135% by weight and 41% by weight, respectively. The carbon fiber strands thus obtained were arranged with predetermined distances in a cement matrix comprising 100 parts by weight of cement, 55 parts by weight of water and 160 parts by weight of sand, in accordance with a conventional manner of a hand lay-up method which is common to a process for the production of a fiber-reinforced cement material, so that ten carbon fiber strands were incorporated. Then, the material thus prepared was subjected to curing in air (temperature: 20° C., relative humidity: 65%), and seven days layer, a carbon fiber-reinforced cement material was obtained. The carbon fiber-reinforced cement material was subjected to a flexural test under the following conditions.

| The size of the test piece: | 32 cm in length, 4 cm in width and 2 cm in thickness |
| --- | --- |
| Span: | 26 cm |
| Location of strands from the bottom of the test piece: | 0.3 cm |
| Three-point flexural test: | Average value of three test pieces |

The flexural physical properties of the cement material are shown in Table 1.

EXAMPLE 2

The same carbon fiber as used in Example 1, was subjected to pretreatment with a 2% epoxy resin aqueous solution (polyethylene glycol-diglycidyl ether). The amount of deposition of the epoxy resin was about 1% by weight relative to the carbon fiber.

The subsequent operation was conducted in the same manner as in Example 1. The physical properties of the carbon fiber-reinforced cement material thus obtained, are shown in Table 1.

The amount of deposition of the styrene-butadiene rubber was 88% by weight, relative to the carbon fiber.

EXAMPLE 3

The same carbon fiber as used in Example 1 was subjected to pre-treatment with a 2% epoxy resin emulsion (a treating solution prepared by adding a surfactant to a reaction product of epichlorohydrin with bisphenol A, followed by emulsification and dispersion). The amount of deposition of the epoxy resin was 1.5% by weight relative to the carbon fiber. The subsequent operation was conducted in the same manner as in Example 1. The physical properties of the carbon fiber-reinforced cement material thus obtained are shown in Table 1.

The amount of deposition of a styrene-butadiene rubber was 95% by weight, relative to the carbon fiber.

COMPARATIVE EXAMPLE 1

By using the same carbon fiber as used in Example 1, a carbon fiber-reinforced cement material was prepared in the same manner as in Example 1 except that no treatment with the rubber solution or rubber latex was conducted. The physical properties of the cement material thus obtained are shown in Table 1.

The amount of deposition of the epoxy resin was 105% by weight relative to the carbon fiber.

COMPARATIVE EXAMPLE 2

By using the same carbon fiber as used in Example 1, a carbon fiber-reinforced cement material was prepared in the same manner as in Example 1 except that no vulcanizing agent or vulcanizing accelerator was mixed to the rubber solution or rubber latex. The physical properties of the cement material thus obtained are shown in Table 1.

The amount of deposition of the epoxy resin and the styrene-butadiene rubber were 89% by weight and 76% by weight, respectively, relative to the carbon fiber.

TABLE 1

| | Physical properties of the carbon fiber | | Physical properties of the carbon fiber-reinforced cement | |
| --- | --- | --- | --- | --- |
| | Monofilament strength (kg/mm$^2$) | Strand strength (kg/mm$^2$) | Flexural strength (kg/cm$^2$) | Flexural deflection (mm) |
| Example 1 | 200 | 185 | 320 | 3.44 |
| Example 2 | " | 190 | 328 | 3.38 |
| Example 3 | " | 186 | 322 | 3.26 |
| Comparative Example 1 | " | 189 | 251 | 2.68 |
| Comparative Example 2 | " | 188 | 230 | 2.77 |

EXAMPLE 4

The same carbon fiber as used in Example 1 was impregnated into a methyl ethyl ketone solution containing 50% by weight of an epoxy resin, and then dried and heat-treated at 80° C. for 20 minutes and at 150° C. for 20 minutes to cure the resin. It was then coated with a self-crosslinking carboxyl-modified styrene-butadiene latex having a solid content of 43% by weight, and then subjected to heat treatment at 150° C. for 5 minutes to cure the rubber. The amounts of deposition of the resin and the rubber were 115% by weight and 47% by weight, respectively, relative to the carbon fiber.

The carbon fiber strands thus obtained were arranged with a predetermined distance from one another in a cement matrix comprising 100 parts by weight of cement, 55 parts by weight of water and 160 parts by weight of sand in accordance with a conventional manner of a hand lay-up method commonly employed for a fiber-reinforced cement material, to incorporate ten carbon fiber strands. Then, the material was cured in air (temperature: 20° C., relative humidity: 65%), and seven days later, a carbon fiber-reinforced cement material was obtained. The carbon fiber-reinforced cement material thus obtained was subjected to a flexural test under the same conditions as in Example 1.

The flexural physical properties of the cement material are shown in Table 2.

EXAMPLE 5

The same carbon fiber as used in Example 1 was subjected to pretreatment with a 2% epoxy resin emulsion (bisphenol A-glycidyl ether). The amount of deposition of the epoxy resin was about 1% by weight relative to the carbon fiber.

The subsequent operation was conducted in the same manner as in Example 4 to obtain a carbon fiber-reinforced cement material. The physical properties of the cement material are shown in Table 2.

The amounts of deposition of the epoxy resin and the self-crosslinking carboxyl-modified styrene-butadiene rubber were 105% by weight and 40% by weight, respectively, relative to the carbon fiber.

EXAMPLE 6

By using the same carbon fiber as used in Example 1, a carbon fiber-reinforced cement material was prepared in the same manner as in Example 4 except that a self-crosslinking carboxyl-modified acrylate was used instead of the self-crosslinking carboxyl-modified styrene-butadiene rubber. The physical properties of the cement material thus obtained are shown in Table 2. The amounts of the epoxy resin and the self-crosslinking carboxyl-modified acrylate were 114% by weight and 34% by weight, relative to the carbon fiber.

COMPARATIVE EXAMPLE 3

By using the same carbon fiber as used in Example 1, a carbon fiber-reinforced cement material were prepared in the same manner as in Example 4 except that no treatment with the self-crosslinking carboxyl-modified styrene-butadiene rubber latex was conducted. The physical properties of the cement material thus obtained are shown in Table 2.

The amount of deposition of the epoxy resin was 121% by weight relative to the carbon fiber.

COMPARATIVE EXAMPLE 4

The same carbon fiber as used in Example 1 was subjected to pretreatment with a 2% epoxy resin emulsion (bisphenol A-glycidyl ether), and then a carbon fiber-reinforced cement material was prepared in the same manner as in Example 4 except that no treatment with the self-crosslinking carboxyl-modified styrene-butadiene rubber latex was conducted. The physical properties of the cement material thus obtained are shown in Table 2. The amount of deposition of the epoxy resin by the pretreatment was 1.8% by weight relative to the carbon fiber. The amount of deposition of the epoxy resin by the first treatment was 98% by weight.

TABLE 2

| | Physical properties of the carbon fiber | | Physical properties of the carbon fiber reinforced cement | |
|---|---|---|---|---|
| | Monofilament strength ($kg/mm^2$) | Strand strength ($kg/mm^2$) | Flexural strength ($kg/cm^2$) | Flexural deflection (mm) |
| Example 4 | 200 | 179 | 337 | 3.52 |
| Example 5 | " | 184 | 340 | 3.48 |
| Example 6 | " | 186 | 344 | 3.35 |
| Comparative Example 3 | " | 191 | 244 | 2.73 |
| Comparative Example 4 | " | 187 | 249 | 2.87 |

We claim:
1. A cement reinforcing fiber prepared by a process comprising:
   impregnating a carbon fiber with from 50 to 200% by weight, relative to said fiber, of a thermosetting epoxy resin;
   coating the impregnated carbon fiber with from 10 to 200% by weight, relative to said fiber, of a styrene-butadiene rubber latex; and then curing said coated fiber.
2. The cement reinforcing fiber of claim 1, wherein said styrene butadiene rubber latex contains a vulcanizing agent and a vulcanizing accelerator.
3. The cement reinforcing fiber of claim 1, wherein said styrene-butadiene rubber latex is a self-crosslinking modified rubber latex.
4. The cement reinforcing fiber of claim 1, wherein said fiber is coated with said styrene-butadiene rubber latex after the thermosetting epoxy resin has partially cured.
5. The cement reinforcing fiber of claim 1, wherein said rubber latex has a filler dispersed therein.

* * * * *